United States Patent [19]

Gortsema et al.

[11] Patent Number: 4,684,511

[45] Date of Patent: * Aug. 4, 1987

[54] PROCESS FOR THE HALOGEN MODIFICATION OF ALUMINOPHOSPHATE MOLECULAR SIEVES AND A PRODUCT SO PRODUCED

[75] Inventors: Frank P. Gortsema, Pleasantville; Brent M. T. Lok, New City, both of N.Y.

[73] Assignee: Union Carbide Corporation, Danbury, Conn.

[*] Notice: The portion of the term of this patent subsequent to Feb. 11, 2003 has been disclaimed.

[21] Appl. No.: 645,214

[22] Filed: Aug. 29, 1984

[51] Int. Cl.$^4$ .............................................. C01B 15/16
[52] U.S. Cl. ................................... 423/305; 423/306; 423/328; 502/77; 502/85; 502/208
[58] Field of Search ................... 423/305, 306, 328; 502/208, 85, 71, 77

[56] References Cited

U.S. PATENT DOCUMENTS

| | | | |
|---|---|---|---|
| 3,394,988 | 7/1968 | Fishwick | 23/110 |
| 3,413,370 | 11/1968 | Fishel | 260/666 |
| 3,477,965 | 11/1969 | Fishel | 252/442 |
| 3,594,331 | 7/1971 | Elliott, Jr. | 252/442 |
| 3,630,965 | 12/1971 | Voohries et al. | 252/442 |
| 3,644,220 | 2/1972 | Kearby | 252/442 |
| 3,699,056 | 10/1972 | Takase et al. | 252/442 |
| 3,702,312 | 11/1972 | Wilson | 252/442 |
| 3,704,113 | 11/1972 | Hildreth | 75/1 |
| 3,816,093 | 6/1974 | Hildreth | 75/1 |
| 3,839,539 | 10/1974 | Elliott et al. | 423/329 |
| 3,853,745 | 12/1974 | Welty, Jr. | 208/139 |
| 3,933,983 | 1/1976 | Elliott, Jr. | 423/328 |
| 3,979,278 | 9/1976 | Hayes | 208/143 |
| 3,980,586 | 9/1976 | Mitchell | 252/455 |
| 4,013,546 | 3/1977 | Suggitt et al. | 252/415 |
| 4,034,058 | 7/1977 | Jameson et al. | 423/118 |
| 4,060,568 | 11/1977 | Rodewald | 260/682 |
| 4,273,753 | 6/1981 | Chang | 423/328 |
| 4,297,335 | 10/1981 | Lok et al. | 423/328 |
| 4,310,440 | 1/1982 | Wilson et al. | 502/208 |
| 4,473,663 | 9/1984 | Patton et al. | 502/208 |
| 4,569,833 | 2/1986 | Gortsema | 423/329 |
| 4,597,956 | 7/1986 | Hinchey et al. | 502/24 |

FOREIGN PATENT DOCUMENTS

| | | | |
|---|---|---|---|
| 0091076 | 10/1983 | European Pat. Off. | 423/328 |
| 2303764 | 3/1976 | France . | |

OTHER PUBLICATIONS

I. M. Kolesnikov, et al., *The Activating Effect of Various Compounds on Zeolites and Aluminosilicates...*, Russian Journal of Physical Chemistry 45(7) 965–967 (1971).

Y. Ishinaga, *Promoting Action of Inorganic Gases on Rate of Dehydration of 2-Propanol Over Ca-Y Zeolite*, Bulletin of the Chemical Society of Japan, vol. 52 (3), 933–934 (1979).

J. H. Fang, et al., *Crystal Structures with a Chabazite Framework...*, Journal of Chemical Society, 3749 (1964).

R. M. Barrer, et al., *The Sorptoin of Ammonium Chloride Vapour in Zeolites...*, Journal of Chemical Society (A), 765–782 (1970).

*Primary Examiner*—John Doll
*Assistant Examiner*—Jackson Leeds
*Attorney, Agent, or Firm*—Vincent J. Vasta, Jr.

[57] ABSTRACT

A process for treating crystalline aluminophosphates to provide aluminophosphates having modified catalytic properties. The crystalline aluminophosphates are contacted with a halogen-derived compound at an effective temperature and for an effective time to alter the surface characteristics of the aluminophosphates with resulting modification of catalytic properties.

15 Claims, No Drawings

PROCESS FOR THE HALOGEN MODIFICATION OF ALUMINOPHOSPHATE MOLECULAR SIEVES AND A PRODUCT SO PRODUCED

BRIEF SUMMARY OF THE INVENTION

1. Technical Field

This invention is directed in general to a process for the treatment of crystalline aluminophosphate molecular sieves to provide adsorptive and modified catalytic properties. This invention is directed to aluminophosphate molecular sieves which have been treated with fluorine, chlorine, bromine, iodine, interhalogen compounds, boron trifluoride, phosphorus trifluoride, phosphorus pentafluoride and mixtures thereof whereby the changes in surface characteristics of the aluminophosphate result in changes in the adsorptive properties and/or catalytic properties.

2. Background Art

Although there are a few notable exceptions, the vast majority of naturally-occurring and synthetic crystalline molecular sieves contain most if not all of the framework atoms as $AlO_4$-tetrahedra, i.e., framework aluminum atoms, together with the $SiO_4$-tetrahedra, comprise the zeolite crystal framework. Relatively few molecular sieves have been extensively studied which do not contain aluminum and silicon as the essential framework constituents.

Although it is generally accepted that the aluminum-containing structural units in an aluminosilicate provide the so-called "acid-sites" which account for the catalytic activity of zeolites in such hydrocarbon conversion reactions as catalytic cracking, the various sites in aluminophosphates are not to be similarly viewed owing to the different framework constituents. Since it is believed that the cation sites are responsible in one or more ways for the adsorptive preference of most zeolites for strongly polar molecules such as water, i.e. their hydrophilic character, one can only speculate the effect of various treatment processes on different molecular sieves when such molecular sieves are vastly different in terms of their acid sites as a result of different framework structures.

A number of different techniques have heretofore been proposed to remove framework aluminum atoms from aluminosilicates to create aluminum-deficient lattice structures having fewer cation sites, and consequently less hydrophilicity and more hydrophobicity, and altered catalytic activities. One of the more common early techniques for dealuminizing zeolites involves contacting either the hydrogen or the decationized form of the zeolite with a known chelating agent for aluminum, such as ethylenediamine tetracetic acid (EDTA) or acetylacetone, and removing aluminum as an organometallic complex. A more recent and more widely used procedure involves prolonged contact of non-metallic cation forms of zeolites with steam at elevated temperatures which can exceed 800° C. The most relevant processes for treatment of aluminosilicates are discussed hereinafter.

U.S. Pat. No. 4,297,335 describes crystalline aluminosilicate zeolite compositions which have been treated with a fluorine gas mixture to alter the framework aluminum content and cation sites and thereby enhance the hydrophobic character of the zeolites. The fluorine gas mixture is comprised of (i) from 0.1 to 20 volume percent fluorine, (ii) from zero to 21 volume percent oxygen and (iii) as the remainder, one or a mixture of two or more inert gases, preferably nitrogen. The starting crystalline aluminosilicate zeolite compositions have at least 50 percent of the framework aluminum atoms not associated with metal cations and are contacted with the fluorine gas mixture at a temperature of from about 50° F. to 400° F.

Copending U.S. patent application Ser. No. 363,560, filed Mar. 30, 1982, now abandoned and commonly assigned, describes a process for enhancing the hydrophobicity of crystalline aluminosilicate zeolites having an initial $SiO_2/Al_2O_3$ molar ratio of at least 5. The zeolites are treated with pure chlorine gas at a temperature of from about 200° C. to about 1000° C. and thereafter purged with a purge gas, i.e., nitrogen, to remove entrapped chlorine gas from the treated zeolite. This treatment results in modification of both the adsorptive properties, i.e., enhanced hydrophobicity, and the catalytic properties of the zeolites.

H. K. Beyer and I. Belenykaja, *A New Method for the Dealumination of Faujasite-Type Zeolites*, Catalysis be Zeolites, Printed in the Netherlands, 203–209 (1980) describes the dealumination of faujasite-type zeolites, particularly Y zeolites, using silicon tetrachloride as the dealuminizing agent. This dealumination process is carried out at high temperatures ranging from about 457° C. to about 557° C.

French Pat. No. 2,303,764 describes a process for increasing the molar ratio of $SiO_2/Al_2O_3$ in the crystalline skeleton of zeolites having $SiO_2/Al_2O_3$ molar ratios of less than 5. The zeolites are first dehydrated by heating to a temperature of at least 400° C. in a reactor equipped with at least one opening in the presence of air or inert gases. Thereafter, gases containing chlorine and/or hydrochloric acid are reacted with the dehydrated zeolite at temperatures between 400° C. and 700° C. It is stated that the zeolite product can then be treated by washing with aqueous solutions of ammonium salts or salts which give ammonium ions, strong aqueous mineral acids, caustic soda or alkaline solutions, or distilled water. Example 11 illustrates that the capacity of adsorption of zeolites with respect to water vapor is practically not altered by treatment of the zeolites according to the process described therein.

In copending U.S. Ser. No. 403,928, filed Aug. 2, 1982, now abandoned but followed by divisional application Ser. No. 725,503, filed Apr. 24, 1985, now U.S. Pat. No. 4,569,833, commonly assigned, is a process which involves the treatment of aluminosilicates and aluminophosphates with silicon tetrafluoride. The process involves silicon substitution or rearrangement of the framework tetrahedral atoms.

None of the aforementioned items disclose a process for treating crystalline aluminophosphates according to the present invention in which the crystalline aluminophosphates are treated with a gas mixture containing: (i) from 0.1 to 100 volume percent of a halogen-derived gas comprising at least one of fluorine, chlorine, bromine, iodine, interhalogen compounds, boron trifluoride, phosphorus trifluoride and phosphorus pentafluoride; (ii) from zero to 21 volume percent oxygen; and (iii) optionally, as the remainder, one or a mixture of two or more inert gases.

SUMMARY OF THE INVENTION

The present invention provides a process for treating aluminophosphates. The process generally comprises contacting a crystalline aluminophosphate with a gas comprising:

(i) from 0.1 to 100 volume percent of a halogen-derived gas comprising at least one of fluorine, chlorine, bromine, iodine, interhalogen compounds, boron trifluoride, phosphorus trifluoride and phosphorus pentafluoride;

(ii) from zero to 21 volume percent oxygen gas; and (iii) optionally, as the remainder, one or a mixture of two or more inert gases, preferably nitrogen.

A preferred embodiment of the present invention comprises contacting the aluminophosphate obtained from the treatment with the halogen-derived gas with an aqueous solution of salt, such as an ammonium salt solution, for a sufficient time to remove fluoride species, such as $AlF^{++}$ and $AlF_2^{+}$, from the treated crystalline aluminophosphate. In addition the final crystalline aluminophosphate can be treated after the instant process by calcination at temperatures from 100° C. up to the crystal destruction temperature of the crystalline aluminophosphate and by rehydration or by a combination of ion exchange, calcination and rehydration treatments in any order.

DETAILED DESCRIPTION OF THE INVENTION

The crystalline aluminophosphates employed in the instant invention include, among others, those described in U.S. Pat. No. 4,310,440 and, in particular, to the species denominated therein as $AlPO_4$-5, $AlPO_4$-8, $AlPO_4$-9, $AlPO_4$-11, $AlPO_4$-12, $AlPO_4$-14, $AlPO_4$-16, $AlPO_4$-17, $AlPO_4$-18, $AlPO_4$-20, $AlPO_4$-22, $AlPO_4$-25, $AlPO_4$-26, $AlPO_4$-28, and $AlPO_4$-31. Reference to one of the aforementioned species is meant herein to denominate that species as described in U.S. Pat. No. 4,310,440. In addition the crystalline aluminophosphate, denominated $AlPO_4$-33, disclosed in copending U.S. Ser. No. 480,698, filed Mar. 31, 1983, now U.S. Pat. No. 4,473,663, issued Sept. 25, 1984 and incorporated herein by reference thereto, may be employed herein. The crystalline aluminophophates of U.S. Pat. No. 4,310,440 are generally described as having a framework structure whose chemical composition expressed in terms of mole ratios of oxides is: $Al_2O_3$: 1.0±0.2 $P_2O_5$; each of said framework structures being microporous in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

The terms "halogen-derived gas" and "halogen-derived compounds" are employed herein to include at least one of the group consisting of fluorine, chlorine, bromine, iodine, interhalogen compounds, boron trifluoride, phosphorus trifluoride and phosphorus pentafluoride. The term "interhalogen compounds" denominates compounds formed from two or more halogens, e.g., $ClF_3$ and $BrF_5$.

The crystalline aluminophosphates may be calcined at above about 100° C. for a period of about 0.1 hours or more prior to being contacted with a halogen-derived gas mixture comprising: (1) from 0.1 to 100 volume percent of a halogen-derived gas, preferably from about 0.25 to about 50 volume percent and more preferably from about 1 to about 25 volume percent of a halogen-derived gas; (2) from zero to 21 volume percent oxygen and (3) optionally, as the remainder, one or a mixture of two or more inert gases. The inert gas is preferably present in an amount from about 50 to about 99.75 volume percent and is preferably one or a mixture of two or more inert gases such as nitrogen, helium, argon and the like. When oxygen and nitrogen are present in the gas mixture, the use of dry air is particularly beneficial. The inert gas acts as a diluent to adjust the halogen-derived gas concentration to a desired level. Low concentrations of the halogen-derived gas in the gas mixture are desirably and effectively used in the process of this invention. However, the gas mixture can contain higher concentrations up to 100 volume percent of the halogen-derived gas.

The crystalline aluminophosphates are contacted with halogen-derived gas at an effective temperature and is preferably from about 20° C. to about 200° C. for an effective period of time to affect the surface characteristics of the aluminophosphate. The more preferred temperature for contacting the halogen-derived gas with the crystalline aluminophosphate is from about 20° C. to about 100° C. and most preferably is at about room temperature (18° C. to 22° C.). The process of this invention is preferably carried out at ambient pressure (14.7 psia), however both atmospheric and superatmospheric pressure conditions may be employed in this process. In general, the effective contact time can vary from a few minutes or less to several hours or longer, i.e., from 1 minute or shorter to 10 hours or longer. The preferred contact time is from about 10 minutes to about four hours. It is readily appreciated that the required contact time will be influenced by the reaction temperature, total pressure, concentration and flow rate of the halogen-derived gas mixture, concentration and choice of the crystalline aluminophosphate and other factors. The process of the present invention is suitably conducted under operative conditions which give reasonable reaction rates and, of course, the desired modification of the crystalline aluminophosphates.

After the crystalline aluminophosphates are contacted with halogen-derived gas under the above described operational conditions, the aluminophosphates are preferably treated with an aqueous solution of at least one salt for a sufficient period of time to remove at least some of any fluoride species associated with the treated crystalline aluminophosphate. Aqueous salt solutions of ammonium or aluminium are generally employable. The removal of the fluoride species can prevent the corrosion of equipment utilized in carrying out the process of the present invention and also equipment used in processes employing the halogen treated aluminophosphates such as catalytic cracking reactions. The crystalline aluminophosphates are preferably contacted one or more times, most preferably three times, with an aqueous solution of ammonium or metal ion (e.g. alkali, alkaline earth or aluminium) in a conventional manner. This step is preferably conducted under operative conditions which give essentially complete removal of residual fluoride species from the crystalline aluminophosphate. The preferred aqueous solution for use in this step is an ammonium salt solution, such as a 10% ammonium chloride or acetate solution.

When the aluminophosphates have been calcined such crystalline aluminophosphates can be rehydrated or washed with distilled water for a sufficient time to remove entrapped metal halides, if any, from the framework of the aluminophosphate(s). Metal halides such as alkali metal halides, alkaline earth metal halides and aluminum halides are removed from the crystalline aluminophosphate structure. Such metal halides can occupy the pore volume surface and cause high water adsorption near saturation. Because many metal halides sublime at relatively low temperatures, the calcination treatment step at the indicated elevated temperatures can also be used to remove impurities from the aluminophosphate. In general, the washing time can vary from a few minutes to several hours or longer. The total washing time will be influenced by the concentration and choice of crystalline aluminophosphate, the amount of metal halides blocking the pore structure of the aluminophosphate and other factors. The water washing step of the present invention is preferably conducted to remove essentially all metal halides from the treated crystalline aluminophosphate.

In some instances it is desirable to have residual halogen-derived compounds present in an amount between about 0.05 and about 6 percent by weight halogen based on the total weight of the treated product and preferably between about 0.1 and about 5 percent by weight halogen, since some catalytic reactions may benefit from the presence of halogen present as a result of treatment with such halogen-derived compounds.

The treated crystalline aluminophosphate (treated with halogen-derived gas) can further undergo calcination at a temperature of from about 100° C. up to the crystal destructon temperature of the aluminophosphate. This calcination step may remove non-metallic cations such as ammonium cations from the crystalline aluminophosphate. The calcination step, in addition to the process step involving contacting the halogen-derived gas with the aluminophosphate(s), provides for high purity aluminophosphate products.

The crystalline aluminophosphate compositions prepared in accordance with the process of the present invention can be used as selective adsorbents or as catalysts in hydrocarbon conversion processes, for example, catalytic cracking processes wherein said hydrocarbon is contacted with a treated aluminophosphate at effective hydrocarbon conversion conditions. Representative hydrocarbon conversion processes include: cracking; hydrocracking; alkylation for both the aromatic and isoparaffin types; isomerization, including xylene isomerization; polymerization; reforming, hydrogenation, dehydrogenation; transalkylation; dealkylation; hydrodecyclization; hydrofining; dehydrocylization; and disproportionation processes. Further, these compositions may be employed to separate molecular species from admixture with molecular species having a less degree of polarity by contacting said mixture with said treated aluminophosphates, preferably activated by heating at greater than 100° C., having at least one of the more polar molecular species whereby molecules of the more polar molecular species are selectively adsorbed into intracrystalline pore system thereof.

Although this invention has been described with respect to a number of details, it is not intended that this invention should be limited thereby. The examples which follow are intended solely to illustrate the embodiments of this invention which to date have been determined and are not intended in any way to limit the scope and the intent of this invention.

EXPERIMENTAL PROCEDURE

In carrying out the process of this invention, it is advantageous to utilize a reactor having means for evacuating the gases therefrom as well as means for regulating the temperature. The reactor used in the examples for contacting the aluminophosphates with halogen-derived gas is an enclosed mild steel container resistant to corrosion by halogen-derived gas. The reactor is approximately 17 inches in length by 10 inches in width with a height of 4 inches and a total volume of approximately 11.8 liters. The reactor is equipped with a removable lid and a ¼ inch stainless steel tubing inlet and outlet. The reactor is heated with a hot plate or an oven. The temperature of a sample in the reactor was measured with a thermocouple embedded in the sample. The temperature of the reactor is controlled to ±5° C. with a temperature controller and the flow of halogen-derived gas and/or diluent was controlled with a series of rotometers. The aluminophosphates are placed inside the reactor in Teflon containers measuring approximately 4 inches in length by 4 inches in width with a height of 1 inch. The halogen-derived gas is thoroughly mixed in a mixing chamber or cylinder before entering the reactor. Gas escaping from the reactor is directed to a scrubber system consisting of a soda lime trap vented to the top of a hood. The general procedure includes: (1) introducing the aluminophosphate starting material into the reactor; (2) adjusting the temperature to the indicated temperatures in the examples; (3) removing the bulk of the air over the aluminophosphate sample by means of a vacuum pump (a pressure of about $10^{-3}$ Torr is adequate) or flushing with nitrogen gas; (4) introducing the halogen-derived gas and/or diluent mixture at a minimal flow rate which results in a continuous flow of the gas mixture through the system for a period of time, e.g. about 1 minute to about 10 hours; and (5) evacuating or flushing the reactor to remove residual halogen-derived gas. Thereafter, the treated aluminophosphate may be treated with an aqueous solution, i.e., ammonium salt solution, for a sufficient time to remove any aluminum fluoride cation species, i.e. $AlF^{++}$ and $AlF_2^+$, from the treated aluminophosphate. The final aluminophosphate product may then be stored in a sealed container to prevent reaction with water vapor.

The catalytic character of the aluminophosphates which have been treated with a halogen-derived gas were evaluated by test procedure involving the catalytic cracking of premixed n-butane at 2 mole percent in a helium stream. The mixture containing 2 mole percent n-butane in helium was obtained from Union Carbide Corporation. The mixture underwent cracking in a one-half inch (outside diameter) quartz tube reactor into which was added 0.5 to 5.0 grams at 20–40 mesh of crystalline molecular sieve sample to be tested. The crystalline molecular sieve sample was activated in situ for 60 minutes at 500° C. under 200 cm³/minute dry helium purge. The mixture containing 2 mole percent n-butane in helium is then passed at a rate of 50 cm³/minute over the aluminophosphate sample for 40 minutes, with a product stream analysis carried out at 10 minute intervals. The first order rate constant was then calculated to determine the activity of the treated aluminophosphate as follows:

First Order Rate Constant (cm³/gm min)=F ln (1−c)/W wherein F is the flow rate in cm³/min., W is the activated aluminophosphate sample weight in grams and c is the mole fraction of n-butane consumed.

The following examples are provided to illustrated the invention and are not intended to be limiting thereof:

EXAMPLE 1

AlPO$_4$-5 was evaluated for its n-butane cracking constant and had a value of 0.05. A five gram sample of AlPO$_4$-5 was calcined at 600° C. for 2 hours in air. The calcined sample was then ion exchanged in a 10 percent by weight solution of ammonium acetate in water under reflux conditions for 1 hour. The mixture was filtered and the solid washed with 500 cubic centimeters of distilled water. The reflux and water wash were repeated two additional times and the material dried in air. The n-butane cracking constant was determined by the procedure above described, and was 0.05.

EXAMPLE 2

AlPO$_4$-11 was evaluated to determine its n-butane cracking constant and was determined to have a value of 0.05. AlPO$_4$-11 was calcined and ion-exchanged by a procedure similar to that employed in example 1 for AlPO$_4$-5. The n-butane cracking constant of the ammonium exchanged AlPO$_4$-11 was 0.04.

EXAMPLE 3

Ten grams of AlPO$_4$-5 as the calcined extrudate was treated with 2.5 volume percent fluorine in a nitrogen stream (volume percent fluorine based on the total volume of fluorine and nitrogen) for a period of 15 minutes at a total flow rate of 1500 cubic centimeters per minute (cc/min) at room temperature (18° C. to 22° C.). A five gram portion of this sample was steamed for 2 hours and 45 minutes at a steam concentration of 16 percent by weight and a temperature of 600° C. The steamed sample was analyzed by x-ray and observed to be highly crystalline and of substantially the same crystallinity of the starting material. The n-butane cracking constant of the steamed product was 0.50.

EXAMPLE 4

A ten gram sample of AlPO$_4$-5 was treated with 5 percent by volume fluorine in nitrogen (volume percent fluorine based on the total volume of fluorine and nitrogen) for 30 minutes at a flow rate of 1500 cc/min at room temperature (18° C.-22° C.) and then purged for 10 minutes with nitrogen at a flow rate of 1500 cc/min. A portion of this sample was ammonium exchanged under reflux conditions and water washed as done in example 1. The product was dried and the n-butane cracking constant determined to be 0.22.

We claim:

1. A process for treating crystalline aluminophosphates which comprises contacting at an effective temperature for an effective time to modify their adsorptive and/or catalytic properties said crystalline aluminophosphates a gas mixture comprising:
   (i) from 0.1 to 100 volume percent of at least one gas selected from the group consisting of fluorine, chlorine, bromine, iodine, and interhalogen compounds containing two or more halogens;
   (ii) from zero to 21 volume percent halogen; and
   (iii) from 0 to 99.9 volume percent inert gas.

2. Process according to claim 1 wherein at least one inert gas is present in addition to (i) and (ii) in an amount from about 50 to 99.75 volume percent.

3. A process according to claim 1 further comprising ion exchanging the crystalline aluminophosphate product of claim 1 with an aqueous solution of at least one salt capable of removing aluminofluoride species from the crystalline aluminophosphate product.

4. A process according to claim 3 wherein the aqueous solution is an aqueous ammonium salt solution.

5. A process according to claim 1 further comprising calcining the crystalline aluminophosphate product at an effective temperature of between about 100° C. and the crystal destruction temperature of the aluminophosphate.

6. A process according to claim 5 further comprising rehydrating the crystalline aluminophosphate after calcining the crystalline aluminophosphate.

7. A process according to claim 2 wherein the inert gas is selected from the group consisting of nitrogen, helium and mixtures thereof.

8. A process of claim 1 wherein the effective temperature is between about 20° C. and about 200° C.

9. The process of claim 1 wherein said aluminophosphate has a framework structure having a chemical composition expressed in terms of mole ratios of oxides as:

$$Al_2O_3: 1.0 \pm 0.2\ P_2O_5$$

each of said framework structures being microporous in which the pores are uniform and have nominal diameters within the range of about 3 to about 10 Angstroms, an intracrystalline adsorption capacity for water at 4.6 Torr and 24° C. of at least 3.5 weight percent, the adsorption and desorption of water being completely reversible while retaining the same essential framework topology in both the hydrated and dehydrated state.

10. The process of claim 9 wherein said aluminophosphate is selected from the group consisting of AlPO$_4$-5, AlPO$_4$-8, AlPO$_4$-9, AlPO$_4$-11, AlPO$_4$-12, AlPO$_4$-14, AlPO$_4$-16, AlPO$_4$-17, AlPO$_4$-18, AlPO$_4$-20, AlPO$_4$-22, AlPO$_4$-25, AlPO$_4$-26, AlPO$_4$-28, AlPO$_4$-31, and AlPO$_4$-33.

11. The process of claim 1 wherein the gas mixture comprises;
   (i) from about 0.25 to about 50 volume percent of a halogen selected from the group consisting of fluorine, chlorine, bromine, iodine and mixtures thereof;
   (ii) from about 0 to about 21 volume percent oxygen; and
   (iii) from about 50 to about 99.9 volume percent of an inert gas.

12. The process of claim 2 wherein the gas mixture comprises from 1 to about 25 volume percent fluorine and an inert gas.

13. A treated crystalline aluminophosphate characterized as having a framework structure having a chemical composition expressed in terms of mole ratios of oxides as $$Al_2O_3: 1.0 \pm 0.2\ P_2O_5$$

each of said framework structures being microporous in which the pores are uniform and have nominal diameters within the range of about 3 to about 10 Angstroms, an intracrystalline adsorption capacity for water at 4.6 Torr and 24° C. of at least 3.5 weight percent, the adsorption and desorption of water being completely reversible while retaining the same essential framework topology in both the hydrated and dehydrated state and having present between about 0.5 and about 6 percent by weight halogen.

14. The treated crystalline aluminophosphate of claim 13 having between about 0.1 and about 5 percent by weight halogen.

15. A process according to claim 3 wherein said aqueous solution contains ammonium, aluminum, alkali metal or alkaline earth metal.

* * * * *